US009973597B1

(12) United States Patent
Karppanen

(10) Patent No.: US 9,973,597 B1
(45) Date of Patent: May 15, 2018

(54) DIFFERENTIAL DICTIONARY COMPRESSION OF NETWORK-ACCESSIBLE CONTENT

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 319 days.

(21) Appl. No.: 14/566,419

(22) Filed: Dec. 10, 2014

(51) Int. Cl.
*H04L 29/06* (2006.01)
*H04L 29/08* (2006.01)

(52) U.S. Cl.
CPC .......... *H04L 69/04* (2013.01); *H04L 67/1095* (2013.01); *H04L 67/42* (2013.01)

(58) Field of Classification Search
None
See application file for complete search history.

(56) References Cited

U.S. PATENT DOCUMENTS

| 7,555,531 B2 | 6/2009 | Teodosiu et al. | |
| 2004/0267836 A1* | 12/2004 | Armangau | G06F 11/1435 |
| 2005/0235043 A1* | 10/2005 | Teodosiu | H03M 7/30 709/217 |
| 2008/0104133 A1* | 5/2008 | Chellappa | G06F 17/30581 |
| 2013/0054543 A1* | 2/2013 | Brown | H03M 7/3084 707/693 |

FOREIGN PATENT DOCUMENTS

WO  2011067769 A1  6/2011

* cited by examiner

*Primary Examiner* — Angela Nguyen
(74) *Attorney, Agent, or Firm* — Knobbe, Martens, Olson & Bear, LLP

(57) ABSTRACT

Server systems are disclosed that retrieve content on behalf of client devices and compress the retrieved content based on information known to be available to the client devices. The server systems may use server-side copies of compression dictionaries stored on the client devices. The compression dictionaries may be based on content portions, scripts, formatting data, and other byte sequences typically found in content. In some embodiments, device-specific, browser-specific, or user-specific compression dictionaries may be used based on content requested by the respective devices/browsers/users, and the server systems may maintain server-side copies of each dictionary. During compression, the server systems may generate additional compression information, such as new compression dictionary entries, and may provide information to the clients about the differences between the server-side and client-side compression dictionaries to so that the client devices can update the client-side compression dictionaries.

22 Claims, 5 Drawing Sheets

DIFFERENTIAL DICTIONARY COMPRESSION OF NETWORK-ACCESSIBLE CONTENT

BACKGROUND

Client devices often use network content browser applications (also referred to simply as "browsers") to obtain content items from servers and to display the content items to users. In a common scenario, a client browser can transmit a request for a content page to a content server, and receive a response, such as a markup file that defines the requested content. The markup file may include data and instructions for displaying the content, and may also reference other files, such as images, executable scripts, and the like. The client device can parse the markup file, identify references to other files, and retrieve the referenced files from the appropriate content servers. This process may continue until all referenced items have been obtained and the content item has been completely parsed, processed, and displayed.

Browsers may implement a variety of techniques to reduce the number of individual files or overall amount of data that must be retrieved for a given content item, thereby reducing the total amount of time and computing resources required to retrieve the content item. For example, browsers may cache previously received files so that the files do not need to be retrieved for subsequent content items that reference the files. As another example, browsers may be configured to obtain compressed versions of content from content sources or intermediary systems, such as proxy servers. By obtaining compressed versions of content, the overall amount of data retrieved via a network connection can be reduced, while still obtaining all data necessary for proper processing and display of a requested content item.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
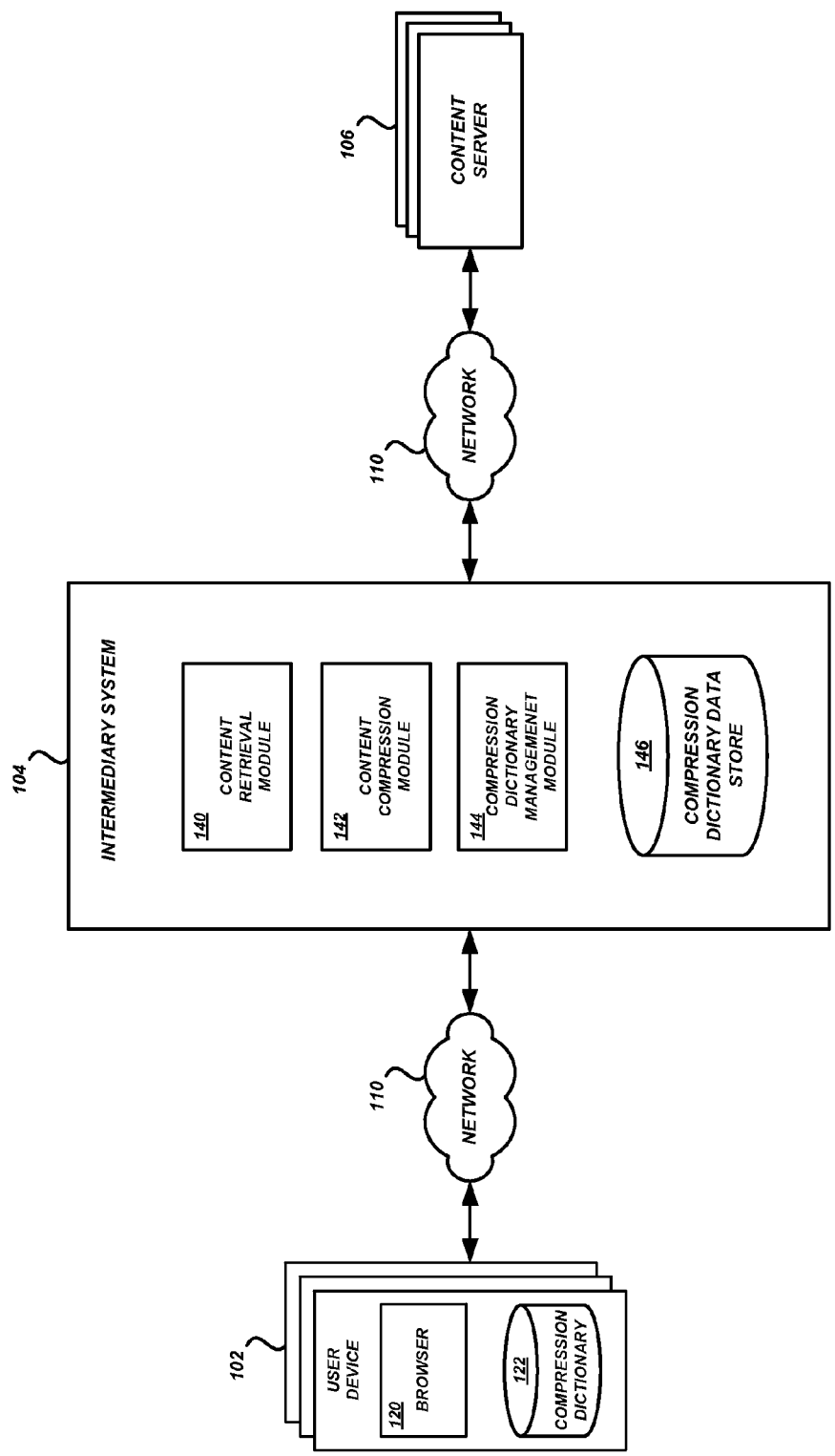
FIG. 1 illustrates a content delivery environment with an intermediary system that processes content and generates differential compression dictionaries for user devices according to some embodiments.

The present disclosure relates to server-side compression of content, requested by a client device, based on data that is known to be present on the client device. In some embodiments, the client device may maintain a client-side compression dictionary tailored for the compression of network content (e.g., the compression dictionary includes byte sequences typically found in network content, such as common scripts, embedded files, formatting data, and the like). The server may maintain an identical or otherwise synchronized server-side copy of the client-side compression dictionary that is on the requesting client device. In some embodiments, the server may maintain server-side copies of multiple different client-side compression dictionaries, such as a server-side copy of a different compression dictionary for each of multiple different client devices. The server may therefore compress content using a server-side copy of the compression dictionary available to the requesting client device and provide the compressed content to the client device without being required to also provide the entire compression dictionary used to compress the content. The client may then decompress the content received from the server using the client-side compression dictionary to obtain a complete, uncompressed version of the requested content. The server can also provide a differential update that includes some or all of the additional byte sequences the server added to the server-side copy of the compression dictionary during compression of the requested content item, or during compression of some set of previously requested content items. In this way, the clients-side copy of the compression dictionary may be updated and synchronized with a new version of the server-side copy of the compression dictionary.

Conventional browser applications implement a variety of techniques to reduce the overall amount of data that must be retrieved for a given content item, thereby reducing the total amount of time and computing resources required to retrieve the content item. For example, browsers may store previously received files in a cache so that the files do not need to be retrieved for subsequent content items that reference the files. However, if a file cached at a client device differs from a current version of the file hosted by a content server, the cached file may not be permitted to be used, thus obviating the benefits provided by caching this particular file. As another example, browsers may be configured to obtain compressed versions of content from content sources or intermediary systems, such as proxy servers. By obtaining compressed versions of content, the overall amount of data retrieved via a network connection can be reduced. However, such systems typically rely on implicit dictionaries that are dynamically generated during the compression and decompression process, and which may not match the overall performance of systems that use pre-generated compression dictionaries tailored for specific purposes.

Some aspects of the present disclosure relate to the generation and maintenance of compression dictionaries tailored specifically for compression of network-accessible content (e.g., content data collections including portions or complete versions of content pages, files, and the like). Exact copies of the compression dictionary can be stored on client devices and the servers that provide compressed content to the client devices (e.g., proxy servers and other intermediary systems, origin content servers, content delivery network or "CDN" servers, and the like). A server may use a copy of the compression dictionary to provide compressed content to the client device without being required to also provide the complete compression dictionary to the client. Instead, the server can generate compressed content by referencing portions of the server-side copy of the compression dictionary, and the client device will be able to decompress the content by referencing the corresponding potions of its client-side copy of the compression dictionary. In some embodiments, a default compression dictionary may be included or bundled with a browser application or client device. The default compression dictionary may be based on content or portions of content expected to be present in or referenced by content requested by the client device. For example, commonly used scripts, commonly used formatting data, portions of popular or commonly-requested content items, and the like may be included in the default compression dictionary. Thus, the compression dictionary may be tailored to the specific byte sequences often found in network-accessible content. Such a compression dictionary can provide higher compression ratios and smaller output files than compression methods that use, e.g., implicit dictionaries dynamically generated during every compression and decompression process.

Additional aspects of the disclosure relate to updating the compression dictionary based on the compression of requested content items. The server may add new byte sequences to the compression dictionary during each compression process (or some subset thereof), such as when the server finds a byte sequence that is a good candidate for inclusion in the compression dictionary (e.g., based on a cost analysis). If portions added to the server-side copy of the compression dictionary are not also available on the client device, the client may not be able to decompress the content. The server can provide the client with updates to the compression dictionary to ensure that the server-side and client-side copies of the dictionary remain identical or otherwise synchronized. In some embodiments, the server can provide differential compression dictionary data to the client device after multiple (e.g., two or more) requested content items have been compressed using a server-side copy of the compression dictionary and additional entries have been made to the server-side copy. The differential compression dictionary data may represent the difference between the server-side copy of the dictionary before and after the server added entries to the dictionary (e.g., the server may maintain a copy of the compression dictionary used by the client device so that the server can continue to compress content that is de-compressible by the client device, and the server may also maintain a separate working copy of the compression dictionary to which additional entries are added). Thus, the differential compression dictionary data corresponds to the difference between the current server-side and client-side copies of the compression dictionary. The server may determine whether to incorporate the differential compression dictionary data into the client-side compression dictionary to be used during future decompression operations based on, e.g., a cost function or some other analysis regarding the benefit of the additional compression dictionary entries. If the server determines to incorporate the differential compression dictionary data into the client-side compression directory, the server can transmit the differential compression dictionary data to the client device. After incorporating the differential compression dictionary data into the client-side compression dictionary, the client device may send a notification to the server so that the server can also update the server-side copy of the decompression dictionary maintained by the server for this particular user device, and the server can use that updated copy to compress content requested by the particular client device in the future.

Further aspects of the present disclosure relate to maintaining, by the client device, multiple different compression dictionaries. When a user initiates a content request at the client device (e.g., by entering a uniform resource locator or "URL" for a content item), the client device can determine which compression dictionary (or subset of compression dictionaries) among the multiple compression dictionaries available on the client device to use for this particular requested content. For example, the client device may include a compression dictionary targeted for a particular class of content items, a particular domain, etc. The client device can include, in connection with the content request, an indicator of the compression directory to be used when compressing the content. The server, which can maintain server-side copies of each of the multiple different compression dictionaries, can therefore select the proper compression dictionary to use. In some embodiments, the server may determine which compression dictionary of the multiple compression dictionaries available to client device to use for compressing a particular content item. In some embodiments, compression dictionaries may be generated for particular client devices, browsers or users of browsers by collecting byte strings commonly found in content often requested by the specific client device/browser/user. Such byte strings can be included in a customized compression dictionary to provide advanced compression tailored not just to network content, but to the specific network content likely to be requested by the client device/browser/user. In such cases, the server can maintain a separate server-side copy of a compression dictionary for each of multiple client devices, and can use the client-specific compression dictionary to compress content for the corresponding client device.

Although aspects of the embodiments described in the disclosure will focus, for the purpose of illustration, on specific compression techniques, one skilled in the art will appreciate that the specific compression techniques are illustrative only, and are not intended to be limiting. In some embodiments, other compression algorithms and techniques may be used in addition to, or instead of, those illustrated and described herein. Various aspects of the disclosure will now be described with regard to certain examples and embodiments, which are intended to illustrate but not limit the disclosure.

System Components

FIG. 1 illustrates an example network environment in which features can be implemented for compressing content pages on an intermediary system, decompressing the content pages on a user device using the same compression dictionary, and using differential dictionary data to update and synchronize server-side and client-side copies of compression dictionaries. The network environment shown in FIG. 1 includes various user devices 102, an intermediary system 104, and various content servers 106. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content servers 106. In addition, multiple (e.g., two or more) intermediary systems 104 may be used. For example, separate intermediary systems 104 may be located so that they are close (in either a geographical or networking sense) to groups of current or potential user devices 102 or content servers 106. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content servers 106, in order to request and display content. Individual user devices 102 may also have a compression dictionary data store 122 to store one or more compression dictionaries. As described in greater detail below, the browser application 120 may use a compression dictionary from the compression dictionary data store 122 to decompress content, and the browser application 120 may use differential compression dictionary data received from the intermediary system 104 to synchronize client-side and server-side copies of the compression dictionary. In some embodiments, a browser add-on, browser extension, or a separate application altogether may provide the client-side compression features described herein.

Each user device 102 may have the same compression dictionary, such as a default compression dictionary that is provided with the user device 102 or browser application 120, or which is obtained from a network source such as the intermediary system 104. As described in greater detail below, individual user devices 102 may modify their respective compression dictionaries over time, such as by applying differential dictionary data received from the intermediary system 104. In some embodiments, a user device 102 may include multiple (e.g., two or more) compression dictionaries, such as a separate decompression dictionary for particular content types, domains, etc.

The intermediary system 104 can be a computing system configured to retrieve content on behalf of user devices 102 and compress the content using copies of the compression dictionaries available on the user devices 102. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval, content compression, and compression dictionary management functionality described herein. For example, the intermediary system 104 may include a content retrieval module 140 to retrieve content from content servers 106 on behalf of user devices 102, a content compression module 142 to compress the retrieved content using a compression dictionary available to the requesting user device 102, a compression dictionary management module 144 to manage the various compression dictionaries available to the various user devices 102, and a compression dictionary data store 146 to store server-side copies of compression dictionaries stored on or otherwise available to the user devices 102. In some embodiments, the intermediary system 104 may include additional, fewer, or alternative modules, data stores, and other components.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As described in greater detail below, the compression dictionary data store 146 may store one or more compression dictionaries for one or more different user devices 102. When a user device requests content via the intermediary system 104, the user device may provide a unique identifier of the user device and/or of the compression dictionary currently stored on or otherwise available to the user device 102. In this way, the intermediary system 104 can access and use a server-side copy of the same compression dictionary when compressing content. In addition, the intermediary system 104 may add entries to the compression dictionary during content compression. The new entries can be made available to the user device through transmission of differential dictionary data that the user device 102 can incorporate into its compression dictionary. The intermediary system 104 may store the updated copy of the compression dictionary in the compression dictionary data store 146 so that for subsequent requests from the user device the intermediary system 104 may continue to have an exact copy of the compression dictionary used by the user device 102.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers), application service providers, etc.

Figure 2:
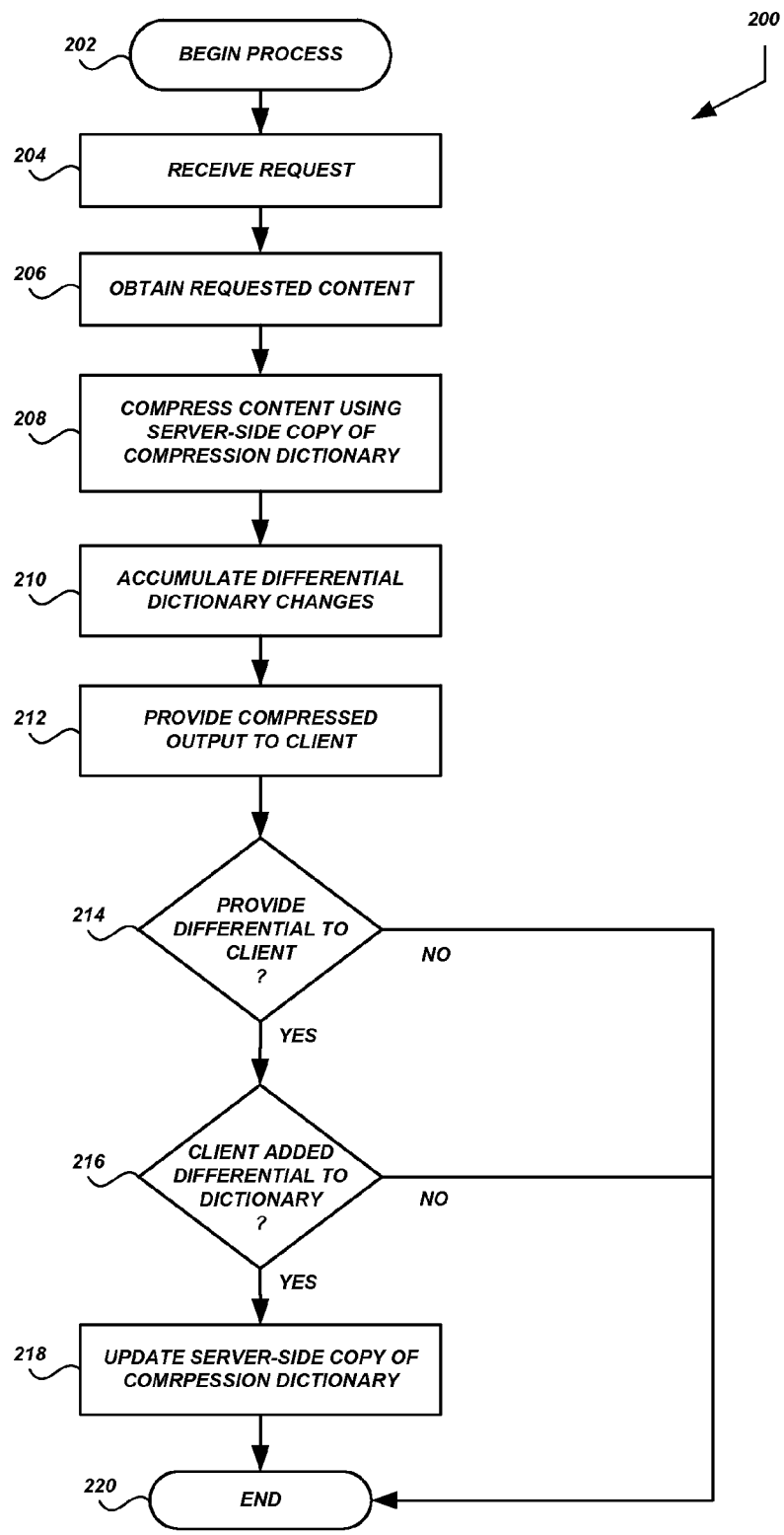
FIG. 2 is a flow diagram of an illustrative process for generating differential compression dictionaries for user devices according to some embodiments.
Figure 3:
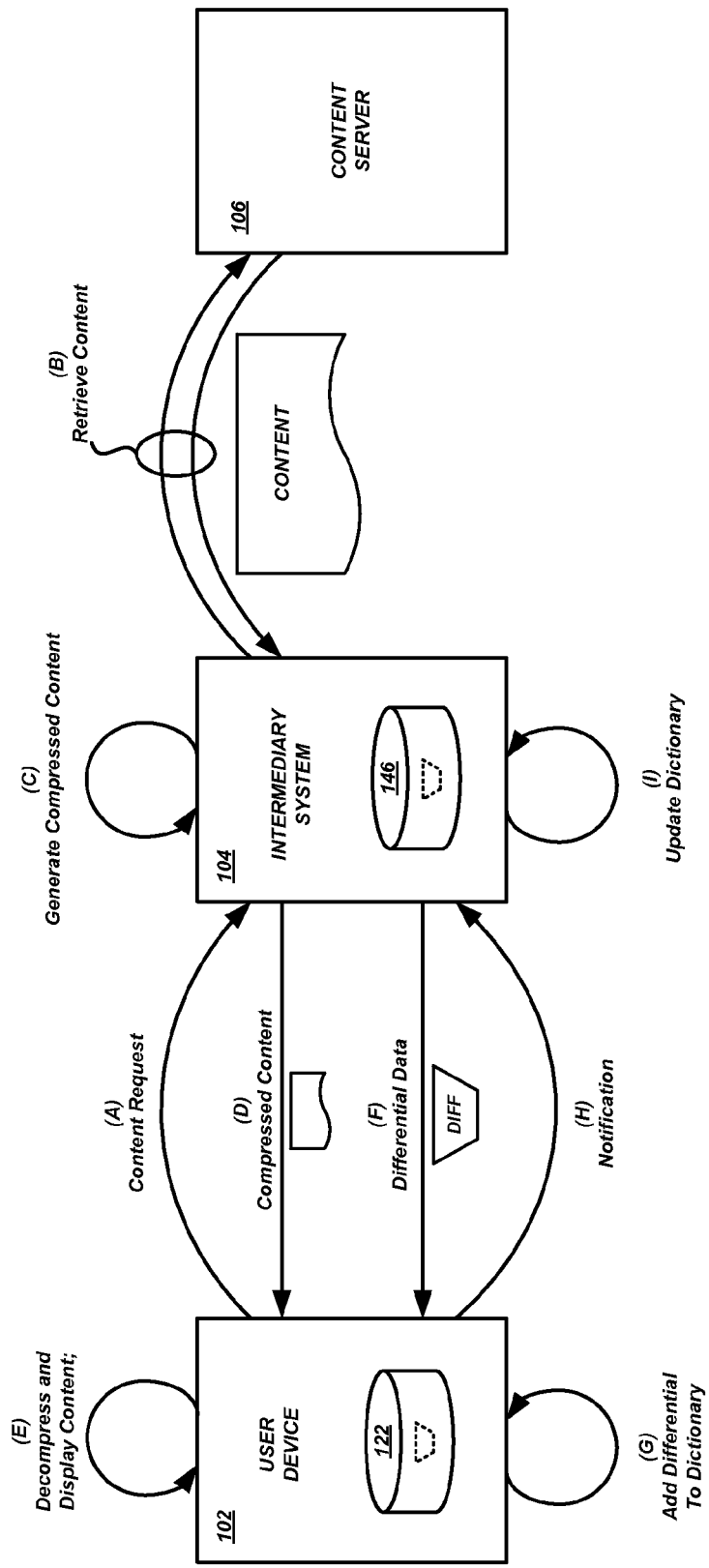
FIG. 3 illustrates example data flows and interactions between a user device, intermediary system, and a content source during content compression and generation of differential compression dictionaries according to some embodiments.

Process for Compressing Content and Generating Differential Compression Dictionaries FIG. 2 is a flow diagram of a sample process 200 for compressing content and generating differential compression dictionary data according to some embodiments. FIG. 3 shows example interactions between a user device 102, an intermediary system 104, and a content source 106 during the process of requesting, obtaining, compressing, and decompressing content using copies of compression dictionaries and differential compression dictionary data. The interactions shown in FIG. 3 will be discussed with respect to a request for, compression of, and decompression of, a content page, such as a web page. Illustratively, the content page may be any content page hosted or offered by a content source, such as a web site or server. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various external objects and including network addresses of servers from where the external objects may be obtained.

The process 200 begins at block 202. At block 204, the intermediary system 104 may receive a request, from a user device 102, for a content page, as shown in FIG. 3 at (A). The intermediary system 104 may instantiate a content retrieval module 140 instance to process and respond to the request, or the intermediary system 104 may assign the request to an existing content retrieval module 140 instance. In some embodiments, the user device 102, browser 120, or user of the browser 120 may be assigned to a particular content retrieval module 140 instance for an entire browsing session or some portion thereof, or the browser 120 may be reconnected to a specific content retrieval module instance 140 after a period of inactivity. For example, the user device 102 may provide a unique identifier of the user device 102, browser 120, or user of the browser 120, and intermediary system 104 may direct requests from the user device 102 to a particular content retrieval module 140 or group of content retrieval modules 140 that have access to the compression dictionary on the user device 102. The compression dictionary on the specific user device 102 may be tailored to content typically or previously requested by the specific user device 102, browser 120, or user of the browser 120.

At block 206, the intermediary system 104 may retrieve the requested content from one or more content servers 106, as shown in FIG. 3 at (B).

At block 208, the intermediary system 104 may compress the retrieved content using a server-side copy of the compression dictionary that is also on the requesting user device 102 or otherwise available to the user device 102, as shown in FIG. 3 at (C). The content compression module 142 may retrieve a server-side copy of the compression dictionary on the requesting user device 102 from the compression dictionary data store 146 using, e.g., an identifier of the user device 102, the browser 120, the user of the browser 120, the compression dictionary itself, some combination thereof, etc. Illustratively, the compression dictionary may include entries for byte sequences found in many content items, such as common script libraries (e.g., JQuery), common layout information, and the like.

As the compression module 142 processes the requested content page, it may find byte sequence matches in the compression dictionary, and the compression module 142 can generate a token or other reference to the compression dictionary entry. Thus, entire sections of the requested content item, or portions of such sections, may be represented by a single token or small number of tokens in the compressed output, providing a substantial savings in total data transmission. Using compression dictionaries tailored to network content can therefore potentially provide a much greater compression ratio and overall compression performance relative to compression dictionaries based on books or other non-network-content-related corpuses of text because compression dictionaries tailored to network content can provide more dictionary hits, longer byte sequence matches, etc.

In addition to using a copy of the compression dictionary that is on the user device 102, at block 210 the compression module 142 can use a separate working copy of the compression dictionary into which the compression module 142 can add new entries. In some embodiments, the compression module 142 can match byte sequences of the requested content item to entries in the working copy of the compression dictionary, and can add new entries with additional bytes added to the matched sequences, thus extending the matched sequences. The compression module 142 can also add new entries to the working copy of the compression dictionary with alternative portions of byte sequences, excluded portions of byte sequences, etc. For example, an existing compression dictionary may include an index or other entry for a commonly-used script, and may include the entire byte sequence for the script, or byte sequences for substantial portions of the script. A new version of the script may have recently been released, and may begin appearing in requested content items. The new version may include changes to portions of the previous script, new features, etc. The compression module 142 can add a new entry to the working copy of the dictionary for the new version in its entirety, one or more new entries that match the changes, additions, or deletions with respect to the prior version, etc. As described in greater detail below, the compression module 142 can subsequently (e.g., in connection with the compressed content, or as a batch update after multiple requested content items have been compressed) provide information about the updated dictionary to the user device 102 so that the user device can update its client-side copy of the compression dictionary.

At block 212, the intermediary system 104 can provide the compressed content page to the user device 102, as shown in FIG. 3 at (D). The user device 102 can decompress and display the content using a client-side copy of the compression dictionary at (E).

At decision block 214, the intermediary system 104 can determine whether or not differential compression dictionary data should be provided to user device 102. If so, the compression module 142 can generate and provide differential compression dictionary data to the user device 102 so that the user device 102 can incorporate the additional compression information into the client-side copy of the compression dictionary and use it to decompress content pages requested in the future. In some embodiments, the determination may be based on the an analysis of the costs and benefits to updating the client-side copy of the compression dictionary, such as the number of times new dictionary entries are expected to be referenced, the impact of such changes on the rest of the dictionary, etc.

As shown in FIG. 3, the differential compression dictionary data can be transmitted to the user device 102 at (F). Illustratively, the differential compression dictionary data may be generated by comparing the server-side copy of the compression dictionary to the working copy of the compression dictionary. The differential data may include indices or offsets to locations in the compression dictionary, and the new data that is to be added or replaced at the indexed or offset locations. In some embodiments, differential compression may be done using: a hash table that maps rolling hash values from a sliding window into substring prefixes;

all-to-all comparison of hash values from n-byte chunks (where n is some integer); generating a suffix tree or array from the server-side copy of the compression dictionary and traversing or otherwise searching for the longest common substrings from positions in the working copy of the compression dictionary; factoring a polynomial equation (where the factors are unique hashes) if an upper bound for the number of differences is known; or by using some other method.

The user device 102 may incorporate the differential compression dictionary data into its client-side copy of the compression dictionary at (G). For example, the user device 102 may replace data in the client-side copy of the compression dictionary at locations indicated by indices or offsets in the differential compression dictionary data with the corresponding data from the differential compression dictionary. If the user device 102 successfully adds the differential compression dictionary data to the compression dictionary, thus altering the copy of the compression dictionary stored on the user device 102, the user device 102 can send a notification to the intermediary system, as shown in FIG. 3 at (H).

At decision block 216 of the process 200 illustrated in FIG. 2, the compression dictionary management module 144 or some other module or component of the intermediary system 104 can determine whether or not a notification has been received from the user device 102 indicating that the user device 102 has incorporated the differential compression dictionary data into the client-side copy of the compression dictionary. If such a notification has been received, the compression dictionary management module 144 or some other module or component of the intermediary system 104 can update the server-side copy of the compression dictionary at block 218 to remain synchronized with the client-side copy, as shown in FIG. 3 at (I). For example, the compression dictionary management module 144 can replace the server-side copy of the compression dictionary with the working copy of the dictionary on which the differential compression dictionary data was based, or the compression dictionary management module 144 can apply the differential compression dictionary data to the server-side copy of the compression dictionary.

Figure 4:
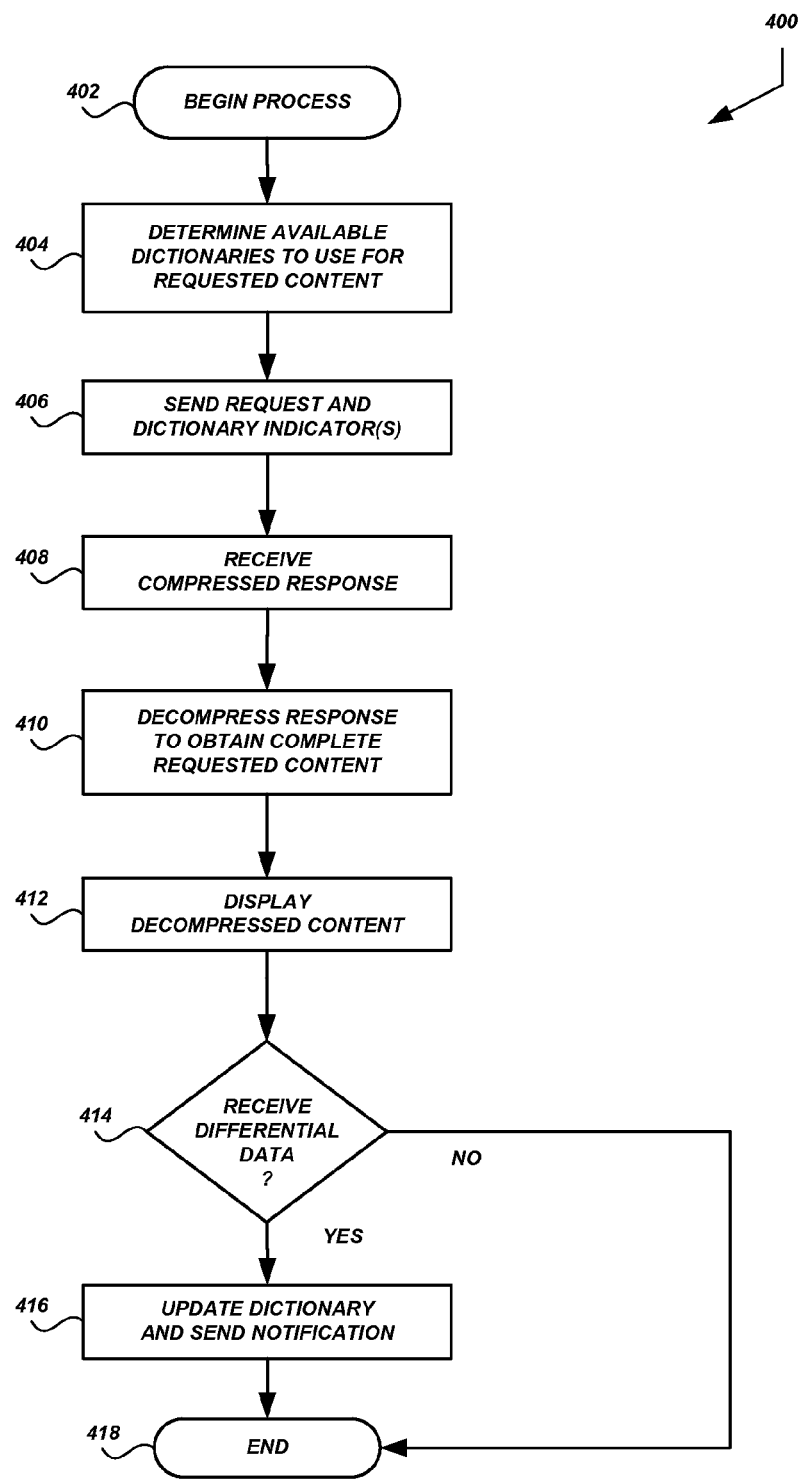
FIG. 4 is a flow diagram of an illustrative process for obtaining and using differential compression dictionaries according to some embodiments.
Figure 5:
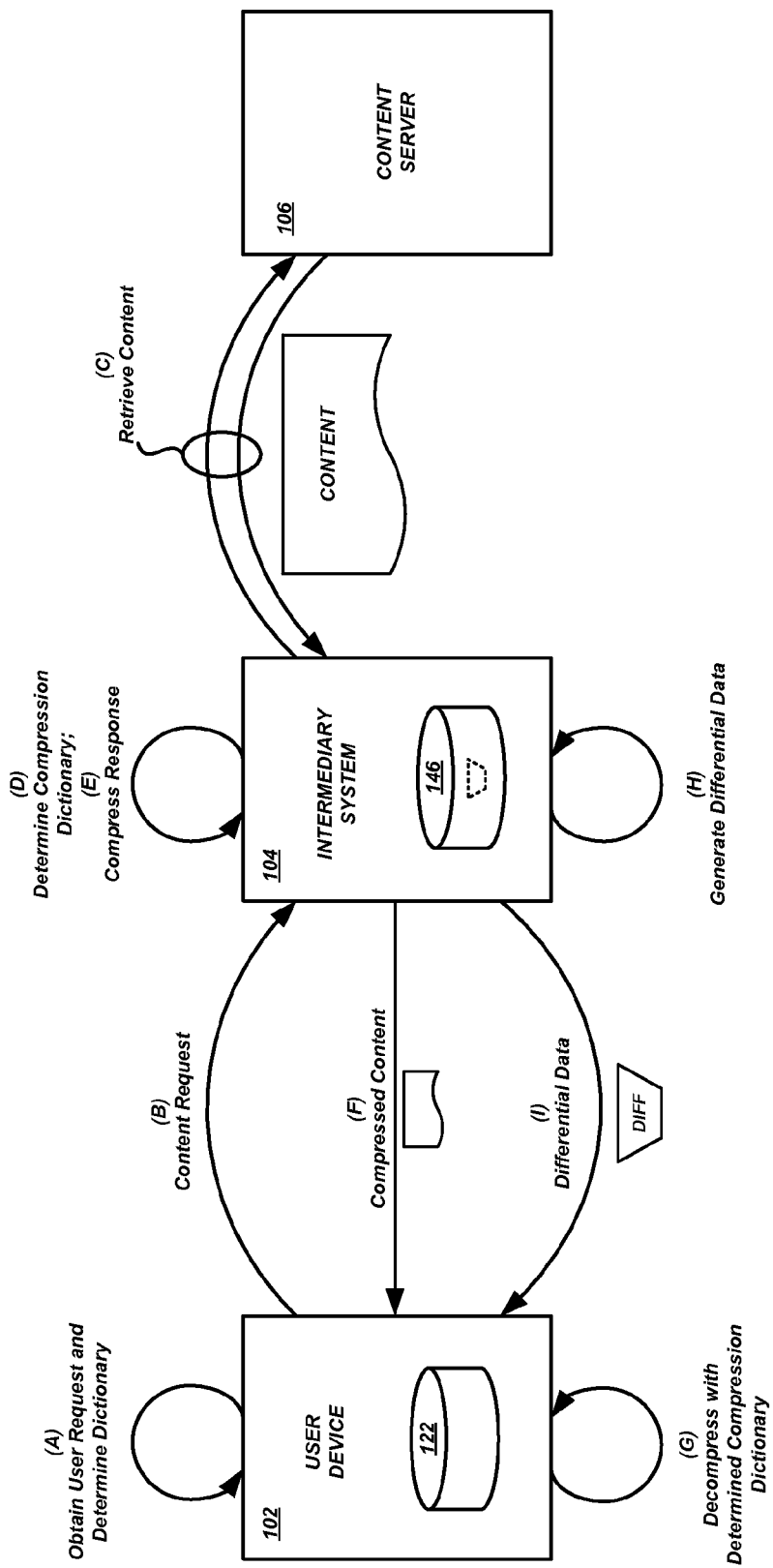
FIG. 5 illustrates additional example data flows and interactions between a user device, intermediary system, and a content source during content compression and generation of differential compression dictionaries according to some embodiments.

Process for Decompressing Content and Using Differential Compression Dictionaries FIG. 4 is a flow diagram of a sample process 400 for decompressing content and applying differential compression dictionary data according to some embodiments. FIG. 5 shows example interactions between a user device 102, an intermediary system 104, and a content source 106 during the process of requesting, obtaining, compressing, and decompressing content using copies of compression dictionaries and applying differential compression dictionary data to server-side copies of the compression dictionaries.

The process 400 begins at block 402. For example, the process 400 may begin automatically upon initiation of a content request, such as a user clicking a link, activating a favorite, launching a new browser instance, entering a uniform resource locator ("URL"), etc.

At block 404, the browser 120 or some other module or component of the user device 102 can determine which compression dictionaries are available to use for decompressing the compressed requested content received from the intermediary system 104, as shown in FIG. 5 at (A). The browser 120 may have multiple (e.g., two or more) individual compression dictionaries on the user device 102 or otherwise available to the user device 102, such as compression dictionaries in the compression dictionary data store 122. The browser 120 may include, in the content request sent to the intermediary system 104, information regarding the available dictionaries as described below with respect to block 406. For example, the browser 120 may restrict the set of available dictionaries when the browser 120 is currently reconstructing one or more of its client-side copies of compression dictionaries after receiving updates from the intermediary system 104. In such cases, the browser 120 may not be able to use those particular dictionaries until application of the updates is complete. In some embodiments, the browser 120 may select the compression dictionary to be used, and may notify the intermediary system 104 of the compression dictionary in connection with the request generated at block 406, below. In some embodiments, the browser 120 may not perform the determination of block 404 and/or transmit information about available compression dictionaries at block 406

As described elsewhere herein, the intermediary system 104 may perform the analysis of which compression dictionary to use because the intermediary system 104 may have knowledge of the dictionaries available on the user device 102 and also information about the content because it is receiving or has received the actual content to be compressed. The intermediary system 104 may have server-side copies of the compression dictionaries on the user device 102, and the intermediary system 104 can chose which compression dictionary to use for a given requested content item and notify the browser 120 of the compression dictionary to use. The intermediary system 104 may base its determination at least in part on information about the requested content item, such as the domain of the requested content item, the class of the requested content item (e.g., news page, photo-sharing page, etc.), or other characteristics of the requested content item. For example, the user device 102 may have a compression dictionary that is tailored for use in decompressing news pages, a different compression dictionary that is tailored for use in decompressing content from shopping sites, a third compression dictionary that is tailored for content hosted by or otherwise associated with a particular domain, etc. Content in each of the different classes may typically include particular scripts, formatting information, embedded resources, and other byte sequences, and the typically included content may be different from class to class. Multiple different compression dictionaries tailored to the individual classes may provide an increase in user-perceived content retrieval and compression/decompression performance relative to a single or small number of large compression dictionaries. For example, smaller dictionaries may be loaded into memory more quickly, may be more easily searched for byte sequence matches, etc. In some embodiments, the intermediary system 104 may determine which compression dictionary to use by performing compression of the requested content with multiple different dictionaries in parallel, and determining which produces the smallest output (e.g., after completion of one or more of the parallel processes, after compression the first n bytes of content where n is some integer, etc.).

At block 406, the browser 120 or some other module or component of the user device 102 can send a request for a content item to a server system, such as the intermediary system 104, as shown in FIG. 5 at (B). In addition, the browser 120 can transmit an identifier for the compression dictionaries identified above, such as a unique identification number for each available dictionary, a hash of each available compression dictionary, etc. The server system can use the identifier to ensure that the proper compression dictionary is used to compress the requested content. For example, the server system can retrieve the requested content from one or more content servers 106 as shown in FIG. 5 at (C), load a server-side copy of the compression dictionary selected by the browser 120 or otherwise identified by the intermediary system 104 at (D), and generate a response at (E) to be sent to the user device 102. In some embodiments, the intermediary system 104 may determine which compression dictionary to use based on an analysis that is the same as or similar to the analysis performed by the user device 102 to select the compression dictionary. Thus, no signaling may be required regarding the compression dictionary to be used.

At block 408, the browser 120 or some other module or component of the user device 102 can receive a response from the server system, as shown in FIG. 5 at (F). The response may include a compressed version of the requested content item. The compressed content may correspond to only the base resource for the requested content (e.g., the Hypertext Markup Language or "HTML" file indicated in the URL sent to the server system above). In such cases, the browser 120 would decompress the base resource at block 410 and (G), identify any referenced resources (e.g., images, JavaScript files, cascading style sheet or CSS files, and the like), and send separate requests for those referenced resources. Thus, some or all of the process 400 may be repeated in a recursive or iterative manner until the requested content item has been received in full. In some embodiments, the server system may obtain some or all resources referenced by the base resource, and may include the referenced resources in a single or small number of compressed responses to the client device. The browser 120 can then decompress the entire requested content item at block 410 and (G).

At block 412, the browser 120 or some other module or component of the user device 102 can cause the uncompressed content to be displayed on the user device 102.

At decision block 414, the browser 120 or some other module or component of the user device 102 can determine whether differential compression dictionary data has been received. If so, the process 400 can proceed to block 416. For example, the intermediary system 104 may generate differential dictionary data at (H) and provide the differential data to the user device 102 at (I). The differential compression dictionary data may have been generated based on changes to the server-side working copy of the compression dictionary for the currently-requested content only, for some batch of requested content items (e.g., a threshold number of items or all items requested in a window of time), etc. In some embodiments, the intermediary system 104 may provide differential compression dictionary data based on differences between the current client-side copy of the compression dictionary and a server-side compression dictionary that has been updated during compression of content requested by multiple (e.g., two or more) different user devices 102.

At block 416, the browser 120 or some other module or component of the user device 102 can apply the differential compression dictionary data to the selected compression dictionary. The browser 120 or some other module or component of the user device 102 can then send a notification to the server system indicating the differential compression dictionary data was merged with the compression dictionary. The server system can then update its server-side copy of the compression dictionary to remain identical to, or otherwise synchronized with, the client-side copy stored on the user device 102.

Additional Embodiments

In some embodiments, the intermediary system 104 may include multiple (e.g., two or more) separate server systems, each of which can compress content using server-side copies of different client-side compression dictionaries, such as different client-side compression dictionaries for each of a plurality of different user devices. A request from a browser 120 of a particular user device 102 may be sent to a server system that does not currently have a server-side copy of one or more of the compression dictionaries available to the browser 120. In such cases, the server system may request a dictionary from some other server system, storage system, etc. For example, the server system may request the dictionary (or dictionaries) based on an identifier (or identifiers) provided by or otherwise associated with the browser 120, user device 102, etc.

In some embodiments, data other than a compression dictionary with entries corresponding to network content byte sequences may be used to decompress content received from the intermediary system 104. For example, an intermediary system 104 may have knowledge of various data available on a given user device 102, and the data may not necessarily be related to a compression dictionary or the browser 120 at all. Rather, the data may be part of documents and other files that are stored on the user device 102. As long as the intermediary system 104 can provide unique identifiers of desired byte sequences (e.g., file names and offsets), the intermediary system 104 may use the other user data 104 to compress content, and the user device 102 will be able to successfully decompress the content.

In some embodiments, compression dictionaries may be generated for particular user devices 102, browsers 120, or users of browsers 120 by collecting byte strings commonly found in content often requested by the user device/browser/user. Such byte strings can be included in a customized compression dictionary to provide advanced compression tailored not just to network content, but to the specific network content likely to be requested by the user device/browser/user.

In some embodiments, the intermediary system 104 may include error correction data in some or all transmissions of compressed content to the user device 102. The specific error correction chosen for the transmissions may require the addition of more data than error correction typically used with network content requests. However, because of the high compression ratios and small compressed file size that may be achieved using the techniques described herein, the size of compressed content and error correction data to be transmitted may still be significantly smaller than the size of uncompressed content, or of content compressed using conventional methods.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 200 and 400 described with respect to FIGS. 2 and 4 may be embodied in a set of executable program instructions stored on one or more non-transitory computer-readable media, such as one or more disk drives or solid-state memory devices, of the user device 102 or a computing system with which the intermediary system 104 is associated. When a process 200 or 400 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a server system configured to act as an intermediary between user devices and content servers, the server system comprising one or more server computing devices, wherein the server system is programmed to at least:
compress content, retrieved on behalf of a user device, using a server-side copy of a compression dictionary that corresponds to a client-side copy of the compression dictionary on the user device, the compression dictionary generated based at least partly on compressing requested content, wherein the compression dictionary comprises byte sequences used in compressing requested content, and wherein an additional compression dictionary entry is generated during compression of the content retrieved on behalf of the user device; and provide to the user device, in response to a request from the user device for the content, both (1) the compressed content and (2) data regarding a difference between the server-side copy and the client-side copy of the compression dictionary, the difference corresponding to the additional compression dictionary entry; and a browser application that runs on the user devices, the browser application configured to at least:
decompress the compressed content using the client-side copy of the compression dictionary; and
update the client-side copy of the compression dictionary using the data regarding the difference between the server-side copy and the client-side copy of the compression dictionary.

2. The system of claim 1, wherein the browser application is further configured to at least synchronize the client-side copy of the compression dictionary with the server-side copy of the compression dictionary by merging, into the client-side copy, at least a portion of the data regarding the difference between the server-side copy and client-side copy.

3. The system of claim 1, wherein the server system is further configured to at least:
maintain a plurality of different server-side copies of compression dictionaries; and
select the server-side copy of the compression dictionary from the plurality of different server-side copies of compression dictionaries based at least partly on a characteristic of content requested by the browser application.

4. The system of claim 2, wherein the browser application is further configured to at least provide a notification to the server system regarding the merging.

5. Non-transitory computer-readable storage having stored thereon computer-executable instructions comprising:
a browser module configured to cause a user computing device to at least:
transmit, to a network-accessible server, a request for content, the content comprising at least a first portion and a second portion;
receive, from the network-accessible server in response to the request from the browser module for the content:
the first portion of the content;
a reference to data in a client-side copy of a content data collection on the user computing device, the referenced data corresponding to the second portion of the content; and
data regarding a difference between a server-side copy of the content data collection and the client-side copy of the content data collection, wherein the difference corresponds to a byte sequence used in decompressing content received from the network-accessible server; and
generate a representation of the requested content based at least partly on the referenced data in the client-side copy of the content data collection.

6. The non-transitory computer-readable storage of claim 5, wherein the browser module comprises one of: a browser application; a browser add-on; a browser extension; or a stand-alone application separate from a browser application.

7. The non-transitory computer-readable storage of claim 5, wherein the network-accessible server is configured to act as an intermediary between user devices and content servers.

8. The non-transitory computer-readable storage of claim 5, wherein the content data collection is previously generated based at least partly on portions of commonly requested content.

9. The non-transitory computer-readable storage of claim 5, wherein the content data collection comprises a compression dictionary generated based at least partly on content requested by one of: the user computing device; the browser module; or a user of the browser module.

10. The non-transitory computer-readable storage of claim 5, the process further comprising synchronizing the client-side copy of the content data collection with the server-side copy of the content data collection by merging, into the client-side copy, at least a portion of the data regarding the difference between the server-side copy and client-side copy.

11. The non-transitory computer-readable storage of claim 5, the process further comprising:
maintaining a plurality of different client-side copies of content data collections; and
selecting the client-side copy of the content data collection from the plurality of different client-side copies of content data collection based at least partly on the content.

12. The non-transitory computer-readable storage of claim 9, the process further comprising decompressing the content based at least partly on additional data stored on the user computing device prior to transmitting the request.

13. The non-transitory computer-readable storage of claim 10, the process further comprising providing a notification to the server system regarding the merging.

14. A computer-implemented method comprising:
as implemented by a server system comprising one or more server computing devices configured to execute specific instructions,
compressing content, retrieved on behalf of a user device, using a server-side copy of a compression dictionary on the server system that corresponds to a client-side copy of the compression dictionary on the user device, wherein the compression dictionary comprises compression dictionary data regarding byte sequences used in compressing content, and wherein additional compression dictionary data is generated during compression of the content; and
in response to a request from the user device for the content, providing, to the user device;
the compressed content; and
data regarding a difference between the server-side copy and the client-side copy of the compression dictionary, the difference corresponding to the additional compression dictionary data.

15. The computer-implemented method of claim 14, wherein the one or more server computing devices are part of a system that acts as an intermediary between user devices and content servers.

16. The computer-implemented method of claim 14, wherein the compression dictionary is a previously-generated compression dictionary based at least partly on compressing commonly requested content.

17. The computer-implemented method of claim 14, further comprising selecting, from a plurality of compression dictionaries comprising a separate device-specific compression dictionary for each of a plurality of user devices, the server-side copy of the compression dictionary based at least partly on data identifying the user device.

18. The computer-implemented method of claim 14, further comprising:
    receiving, from the user device, an identifier of the client-side copy of the compression dictionary; and
    selecting, from a plurality of server-side copies of compression dictionaries, the server-side copy of the compression dictionary to use when compressing the content, the server-side copy selected based at least partly on the identifier.

19. The computer-implemented method of claim 14, further comprising determining whether to synchronize the client-side copy of the compression dictionary with a working server-side copy of the compression dictionary based at least partly on an analysis of a new entry in the working server-side copy of the compression dictionary.

20. The computer-implemented method of claim 17, wherein individual compression dictionaries of the plurality of compression dictionaries are generated based on content requested by a corresponding user device.

21. The computer-implemented method of claim 19, further comprising generating the data regarding the difference based at least partly on a comparison of the server-side copy of the compression dictionary and the working server-side copy of the compression dictionary.

22. The computer-implemented method of claim 21, wherein the working server-side copy of the compression dictionary comprises entries added during compression of a plurality of previously-requested content items.

* * * * *

UNITED STATES PATENT AND TRADEMARK OFFICE
CERTIFICATE OF CORRECTION

PATENT NO. : 9,973,597 B1
APPLICATION NO. : 14/566419
DATED : May 15, 2018
INVENTOR(S) : Jari Juhani Karppanen Page 1 of 1

It is certified that error appears in the above-identified patent and that said Letters Patent is hereby corrected as shown below:

In the Claims

In Column 16, Line 50, Claim 14, change "device;" to --device:--

Signed and Sealed this
Twenty-eighth Day of May, 2019

Andrei Iancu
*Director of the United States Patent and Trademark Office*